(12) United States Patent  
Spieth

(10) Patent No.: US 10,156,179 B2  
(45) Date of Patent: Dec. 18, 2018

(54) SUPPORT UNIT FOR SUPPORTING AN EXHAUST SYSTEM OF A VEHICLE

(71) Applicant: Eberspächer Exhaust Technology GmbH & Co. KG, Neunkirchen (DE)

(72) Inventor: Arnulf Spieth, Hochdorf (DE)

(73) Assignee: Eberspächer Exhaust Technology GmbH & Co KG, Neunkirchen (DE)

( * ) Notice: Subject to any disclaimer, the term of this patent is extended or adjusted under 35 U.S.C. 154(b) by 280 days.

(21) Appl. No.: 15/019,337

(22) Filed: Feb. 9, 2016

(65) Prior Publication Data

US 2016/0230638 A1    Aug. 11, 2016

(30) Foreign Application Priority Data

Feb. 10, 2015    (DE) .................... 10 2015 101 846

(51) Int. Cl.

| F01N 13/18 | (2010.01) |
| F01N 13/10 | (2010.01) |
| B60K 13/04 | (2006.01) |

(52) U.S. Cl.  
CPC ......... *F01N 13/1805* (2013.01); *F01N 13/10* (2013.01); *F01N 13/1822* (2013.01); *F01N 13/1855* (2013.01); *F01N 13/1872* (2013.01); *B60K 13/04* (2013.01); *B60Y 2306/01* (2013.01)

(58) Field of Classification Search  
CPC .. F01N 13/10; F01N 13/1805; F01N 13/1822; F01N 13/1855; F01N 13/1872; B60K 13/04; B60Y 2306/01  
See application file for complete search history.

(56) References Cited

U.S. PATENT DOCUMENTS

| 3,161,252 A | 12/1964 | Brown |
| 6,209,844 B1 | 4/2001 | Brücker et al. |
| 8,833,502 B2 | 9/2014 | Sellars |

FOREIGN PATENT DOCUMENTS

| CN | 102410072 A | 4/2012 |
| CN | 103306794 A | 9/2013 |
| DE | 198 15 705 A1 | 10/1999 |
| DE | 10 2005 003938 A1 | 8/2006 |
| DE | 10 2009 031 890 B3 | 3/2011 |
| GB | 2 212 771 A | 8/1989 |
| KR | 10-2006-0002874 A | 1/2006 |

*Primary Examiner* — Phutthiwat Wongwian  
*Assistant Examiner* — Diem Tran  
(74) *Attorney, Agent, or Firm* — McGlew and Tuttle, P.C.

(57) ABSTRACT

A support unit for supporting an exhaust system of a vehicle includes a first connecting element (26), a second connecting element (28) and at least one coupling element (30) coupling the first connecting element with the second connecting element. A first coupling element passage opening (38) is provided in the first connecting element and a second coupling element passage opening (40) is provided in the second connecting element. The coupling element passes through the first coupling element passage opening (38) and the second coupling element passage opening. A coupling element clamping area is provided in a first longitudinal area (L1) of at least one first coupling element passage opening and a coupling element clamping release area (44) is provided in a second longitudinal area (L2) of this first coupling element passage opening. The coupling element clamping area has a greater thickness than the coupling element clamping release area.

20 Claims, 2 Drawing Sheets

SUPPORT UNIT FOR SUPPORTING AN EXHAUST SYSTEM OF A VEHICLE

CROSS REFERENCE TO RELATED APPLICATIONS

This application claims the benefit of priority under 35 U.S.C. § 119 of German Patent Application DE 10 2015 101 846.2 filed Feb. 10, 2015, the entire contents of which are incorporated herein by reference.

FIELD OF THE INVENTION

The present invention pertains to a support unit, by means of which an exhaust system of a vehicle can be supported or carried in relation to the vehicle, especially in relation to a drive unit of same.

BACKGROUND OF THE INVENTION

Especially in front engine type vehicles, a drive unit is arranged together with or as a part of an exhaust system. A vehicle front wall may separate the vehicle interior space from the engine compartment. In the front area of a vehicle, the exhaust system may be supported by, i.e., carried on, a plurality of support units in relation to the drive unit. In case of an impact of an obstacle, in particular at the front area of a vehicle, the obstacle acts on the drive unit and displaces same in the direction towards the front wall. Because of an essentially rigid coupling of the exhaust system with the drive unit via the support units (e.g., made of steel plate material), the exhaust system, especially the area of same arranged in the engine compartment, is also displaced towards the front wall.

SUMMARY OF THE INVENTION

An object of the present invention is to provide a support unit for supporting an exhaust system of a vehicle, with which an increased safety for the persons located in a vehicle in case of a collision can be achieved.

According to the present invention, this object is accomplished by a support unit for supporting an exhaust system of a vehicle, comprising a first connecting element, a second connecting element and at least one coupling element coupling the first connecting element with the second connecting element, wherein a first coupling element passage opening is provided in association with the at least one coupling element in the first connecting element and a second coupling element passage opening is provided in the second connecting element and wherein the at least one coupling element passes through the first coupling element passage opening and the second coupling element passage opening associated with it, a coupling element clamping area being provided at least in case of the first connecting element in a first longitudinal area of at least one first coupling element passage opening and a coupling element clamping release area being provided in a second longitudinal area of this first coupling element passage opening, the coupling element clamping area having a greater thickness than the coupling element clamping release area.

In a support unit designed according to the present invention, the two connecting elements are able to be moved in relation to one another due to the mobility of the at least one coupling element in at least one coupling element passage opening receiving this coupling element. In case of an acting force, for example, during an impact with an obstacle, an exhaust system carried by means of one or more such support units can thus be uncoupled, for example, from a drive unit of a vehicle, so that the risk that the exhaust system penetrates into the area of the vehicle interior space is reduced.

In order to be able to make the extent of the relative mobility of the two connecting elements as great as possible, it is suggested that the at least one first coupling element passage opening be an elongated hole, and that the first longitudinal area and the second longitudinal area follow one another in longitudinal direction of the elongated hole.

The variations in thickness between the coupling element clamping area and the coupling element clamping release area may be achieved in a simple manner by the first connecting element being designed with a greater material thickness in the coupling element clamping area than in the coupling element clamping release area.

This change in material thickness may be achieved in an especially simple manner by the first connecting element being folded at least once for providing the coupling element clamping area.

In order to be able to provide the transition from a thicker area to a thinner area next to at least one coupling element passage opening by folding when providing the change in material thickness, it is suggested that at least one folded section positioned by folding next to a first coupling element passage opening be provided for providing the coupling element clamping area.

A coupling thickness between the two connecting elements that is also suitable for greater loads can be guaranteed by a plurality of first coupling element passage openings being provided in the first connecting element, preferably the first coupling element passage openings being arranged next to one another in relation to a coupling element direction of motion from the coupling element clamping area to the coupling element clamping release area. In particular, a folded section may be positioned in this connection between at least two first coupling element passage openings.

A support unit according to the present invention may be manufactured in an especially simple and cost-effective manner by at least the first connecting element being provided as a sheet metal part.

The present invention pertains, further, to a drive system for a vehicle, comprising a drive unit with an internal combustion engine and an exhaust system guiding combustion waste gases away from the internal combustion engine, further comprising at least one support unit designed according to the present invention.

In order to be able to use one or more support units as diversely as possible in this case, it is suggested that at least one support unit be arranged for supporting the exhaust system in relation to the internal combustion engine, or/and that the drive unit comprise a transmission and at least one support unit be arranged for supporting the exhaust system in relation to the transmission, or/and that at least one support unit be arranged for supporting a first area of the exhaust system in relation to a second area of the exhaust system.

Since, in case of an impact of a vehicle with an obstacle, the direction of acting force is frequently essentially oriented in a longitudinal direction of the vehicle, it is further suggested that a coupling element direction of motion from the coupling element clamping area to the coupling element clamping release area correspond essentially to a longitudinal direction of a vehicle having the drive system in at least one support unit. In this way, the extent of motion provided in a support unit designed according to the present invention can be utilized very efficiently.

The present invention is described in detail below with reference to the attached figures. The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
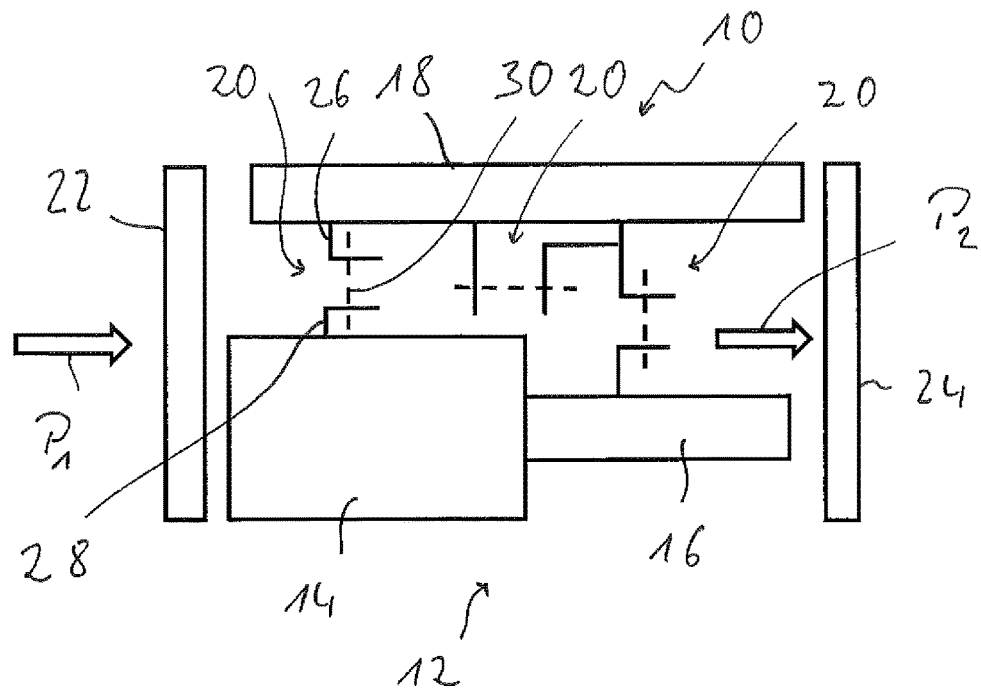
FIG. 1 is a schematic view of a drive system for a vehicle.

Referring to the drawings, FIG. 1 shows a schematic view of a drive system 10 of a vehicle. The drive system 10 comprises a drive unit 12 with an internal combustion engine 14 and with a transmission 16 coupled with the internal combustion engine 14. The combustion waste gases generated in the combustion operation of the internal combustion engine 14 are guided by an exhaust system, generally designated by 18, away from the internal combustion engine 14. The exhaust system 18 may comprise an exhaust elbow which is connected, for example, to the internal combustion engine 14 or may be connected to the internal combustion engine 14 via this exhaust elbow.

Based on the vehicle being a front engine type vehicle, the drive unit 12 is arranged together with the or with a part of the exhaust system 18 in an engine compartment in front of a front wall 24, with respect to the direction of travel, separating the vehicle interior space from the engine compartment. In the front area of a vehicle, the exhaust system 18 is supported by, i.e., carried on a plurality of support units 20 in relation to the drive unit 12 and thus in relation to the rest of the vehicle. Various areas of the exhaust system 18 itself can also be supported by means of one or more such support units 20 in relation to one another in order to achieve a reinforcement and an increased stability in the exhaust system 18 itself. The exhaust system 18 may comprise in this connection, for example, a plurality of exhaust gas pipes running partially also in a curved pattern or a catalytic converter area or/and muffler area and the like.

In case of an impact of an obstacle 22 in the direction of an arrow P1 on a vehicle, in particular the front area of a vehicle, the obstacle 22 acts on the drive unit 12 and displaces same in the direction towards the front wall 24. The invention provides features for a motion uncoupling of the exhaust system 18 from the drive unit 12 via the support units 20, such that the exhaust system 18, especially the area of same arranged in the engine compartment, is not also displaced or not fully displaced in the direction of an arrow P2 towards the front wall 24.

The design of a support unit according to the present invention, with which an exhaust system can be supported in relation to a drive unit of a vehicle, is described in detail below with reference to FIGS. 2 and 3. The design of a vehicle and of a drive system, in which such a support unit 20 can be used was described in detail above with reference to FIG. 1.

Figure 2:
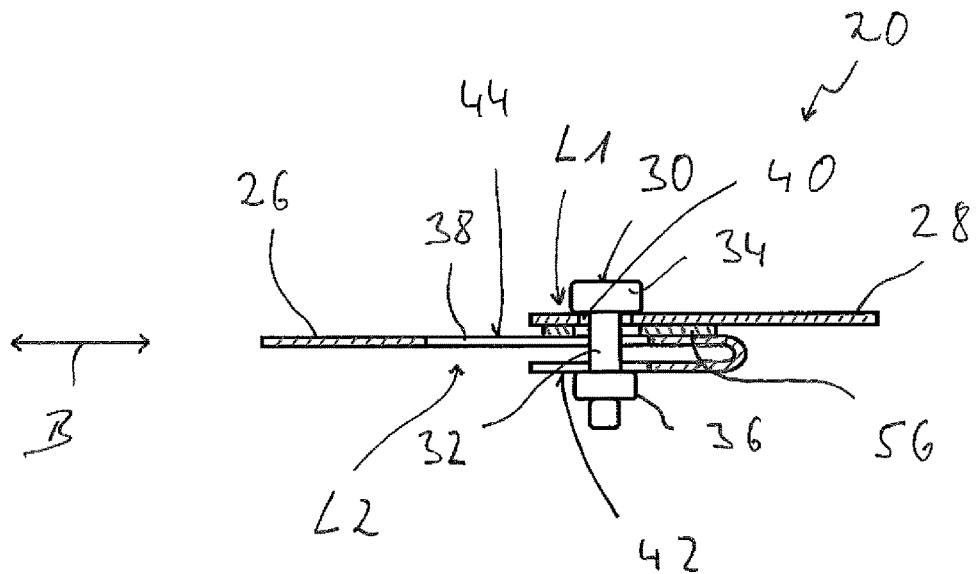
FIG. 2 is a sectional view of a support unit for an exhaust system of the drive system from FIG. 1.

FIG. 2 shows a support unit 20 according to the present invention, which has a first connecting element 26 as well as a second connecting element 28 as essential system components. The two connecting elements 26, 28 are connected to one another by means of a coupling element 30, which is designed in this embodiment as a bolt 32 with a bolt head 34 and a screwed-on nut 36, e.g., a cage nut. A first coupling element passage opening 38, which is designed as an elongated hole, is provided in the first connecting element 26. A second coupling element passage opening 40 is provided in the second connecting element 28.

A coupling element clamping area 42, in which the first connecting element 26 has a greater thickness than in a coupling element clamping release area 44 adjoining the coupling element clamping area 42, is provided at the first connecting element 26. As will be described below, the coupling element clamping area 42 may be provided with a greater thickness by a blank 46, shown in FIG. 3, being folded about a fold line F for the first connecting element 26. The first coupling element passage opening 38, which is designed as an elongated hole, extends with a first longitudinal area L1 in the coupling element clamping area 42 and with a second longitudinal area L2 in the coupling element clamping release area 44.

In the coupling state shown in FIG. 2, the coupling element 30 passes through the second coupling element passage opening 40 in the second connecting element 28 essentially without clearance of motion and passes through the first coupling element passage opening 38 in the first connecting element 26 in the coupling element clamping area 42 of the first connecting element 26. By tightening the nut 36, the two connecting elements 26, 28 are pressed rigidly against one another. Because of the frictional force connection generated in the area of the contact of the connecting elements 26, 28 with one another and also because of the frictional force connection generated in the area of the contact of the nut 36 at the first connecting element 26, the two connecting elements 26, 28 are basically rigidly connected to one another. In order to be able to hold, for example, the exhaust system 18 rigidly in this state in relation to the drive unit 12, the first connecting element 26 may, for example, be fixed to the exhaust system 18 by means of screwing, clamping or by material connection, for example, welding. In a corresponding manner, the second connecting element 28 may be fixed, for example, to the transmission 16 and to the internal combustion engine 14. In the case of a support unit 20 being used to stabilize the exhaust system 18 in itself, then both connecting elements 26, 28 may each be fixed to various areas of the exhaust system 18. It is, for example, also possible here for at least one of the connecting elements 26, 28 to come into contact with a connecting element of another support unit 20, as this is shown in FIG. 1.

If a drive system 10 having such a design strikes an obstacle 22 and forces are generated in this case because of the inertia between the drive unit 12 and the exhaust system 18, then the two connecting elements 26, 28 are displaced in relation to one another while overcoming the above-mentioned frictional force connection, and at first the coupling element 30 extends in the first longitudinal area L1 of the first coupling element passage opening 38, which lies in the coupling element clamping area 42. If the coupling element 30 reaches the coupling element clamping release area 44, then the clamping force generated by the coupling element 30 is entirely neutralized and the two connecting elements 26, 28 can be further displaced in relation to one another essentially in a manner free from force. The exhaust system 18 may thus be displaced to an extent corresponding to the longitudinal extension of the first coupling element passage opening 38 in a direction of motion B from the coupling element clamping area 42 to the coupling element clamping release area 44. A coupling remains only in the area of the direct connection of the exhaust system to the internal combustion engine 14 by means of the exhaust elbow. Because of the curved shape of the exhaust elbow, this is, however, comparatively easy to deform.

In case of motion of the drive unit 12 in the direction towards the front wall 24, a penetration of the exhaust system 18 into the vehicle interior space can thus be avoided because of the motion uncoupling of the exhaust system 18 from the drive unit 12. The fact that one or more support units 20, which support the exhaust system 18 in itself and thus reinforce it, is equally uncoupled, also contributes to this, such that the stability of the exhaust system 18 also decreases in itself, and in case of a collision of the exhaust system 18 on the front wall, a considerable part of the energy is also removed by the exhaust system 18 being deformed in itself.

It is advantageous when the first coupling element passage openings 38 are oriented in a drive system 10 such that the maximum stroke of motion of the exhaust system in relation to the drive unit 12 is achieved in case of a force application direction primarily to be expected. In particular, it is advantageous when the or each support unit 20 is oriented in a vehicle such that the direction of longitudinal extension of the first coupling element passage opening 38, which essentially corresponds to the direction of motion B, is oriented in the longitudinal direction of the vehicle.

Figure 3:
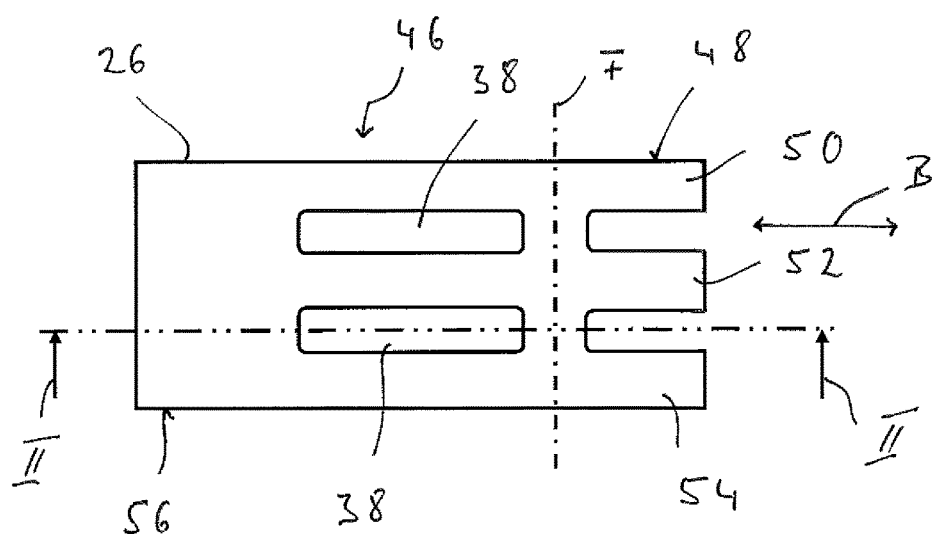
FIG. 3 is a top view of a blank of a first connecting element of the support unit of FIG. 2.

It can be seen in FIG. 3 that in the blank 46, which is designed, for example, as a sheet metal part, for the first connecting element 26, two first coupling element passage openings 38 are provided lying next to one another in relation to the direction of motion B. Folded sections 50, 52, 54 are formed at an end area 48 of the blank 46 in relation to the direction of motion B, each laterally next to the first coupling element passage openings 38. By folding the blank 46 about the fold line F, the folded sections 50, 52, 54 are positioned such that they are positioned each laterally next to the first coupling element passage openings 38 or between same. Since the folded sections 50, 52, 54 are shorter than the first coupling element passage openings 38, the configuration, which can be seen in FIG. 2, is obtained, in which the folded sections 50, 52, 54 overlap only a partial area of the first coupling element passage openings in the direction of motion B for providing the coupling element clamping area 42 and thus a greater thickness of the first connecting element is produced only in this partial area. In order to be able to produce an even greater variation in thickness here in comparison to the coupling element clamping release area 44, the folded sections 50, 52, 54 could also be folded multiple times.

In the second end area 56, the blank 46 may be shaped or designed such that it can be connected to one of the system areas to be coupled with one another, i.e., for example, the exhaust system 18 or the internal combustion engine 14 or the transmission 16.

It is possible with the design of a support unit 20 described above in a simple and at the same time reliable manner to connect an exhaust system 18 to a drive unit 12 or to be stabilized in itself and at the same time to provide a motion uncoupling, however, in order to thus avoid a penetration of the exhaust system 18 into a vehicle interior space caused by the forced coupling with the drive unit 12 in the case of an impact with an obstacle 22.

As already explained, the connecting elements may be made of steel material, for example, steel plate material. Aluminum may also be used as a material of which they are made. In this case, the first connecting element 26 may be produced as a solid component, e.g., in a casting process with its variation in thickness for providing the transition from the coupling element clamping area 42 to the coupling element clamping release area 44.

In order to protect the connecting elements 26, 28 also against corrosion or heat stress, they may, as an alternative to a basically uncoated design, also be coated with a coating. Of course, the connecting elements 26, 28 may be formed from one part or may be composed of multiple parts. In order to protect the structural elements of a support unit 20 according to the present invention against excessive temperature stress, for example, heat-insulating elements 56, such as thin mica plates, mats or plates made of heat-insulating material or fiber composite material may be provided in the area of same adjoining one another. A sheathing of one or more of the structural elements with such a material is also possible. For providing an improved protection against corrosion, one or more of the structural elements of a support unit 20 according to the present invention may be coated, for example, with Teflon or plastic material. A surface treatment, for example, plasma treatment, eloxadizing, galvanizing, is also possible. Basically, the structural elements may also be coated with an anticorrosive alloy. The interstratification of anticorrosive layers, e.g., made of mica material or made of rubber material, is also possible.

Finally, it should be pointed out that the widest variety of variations of the support unit described above and shown in the figures may be made. Thus, more or fewer than two coupling elements may be used for coupling the two connecting elements. Both connecting elements could also be designed as the first connecting element described above. In the coupling state, the two coupling element clamping areas would then be positioned in a manner overlapping one another. The essential advantage of such a design lies in the fact that the second coupling element passage openings could also be designed as elongated holes, which would guarantee an even greater stroke of motion of the exhaust system in relation to the drive unit and thus an even better uncoupling in the case of an impact.

While specific embodiments of the invention have been shown and described in detail to illustrate the application of the principles of the invention, it will be understood that the invention may be embodied otherwise without departing from such principles.

What is claimed is:

1. A support unit for supporting an exhaust system of a vehicle, the support unit comprising:

a first connecting element with a first coupling element passage opening, provided in association with the at least one coupling element, wherein a coupling element clamping area is provided in a first longitudinal area of the first coupling element passage opening and a coupling element clamping release area is provided in a second longitudinal area of the first coupling element passage opening, the coupling element clamping area having a greater thickness than a thickness of the coupling element clamping release area, the first coupling element passage opening being an elongated hole with an elongated hole longitudinal direction, wherein the first longitudinal area and the second longitudinal area follow one another in the elongated hole longitudinal direction;
a second connecting element with a second coupling element passage opening; and
at least one coupling element coupling the first connecting element with the second connecting element, the at least one coupling element passing through the first coupling element passage opening and passing through the second coupling element passage opening such that the at least one coupling element is movable along the first coupling element passage opening from the first longitudinal area into the second longitudinal area.

2. The support unit in accordance with claim 1, wherein the first connecting element has a greater material thickness in the coupling element clamping area than in the coupling element clamping release area.

3. The support unit in accordance with claim 1, wherein the first connecting element is folded to form the coupling element clamping area, wherein at least a portion of the coupling element release area is located outside of the coupling element clamping area.

4. The support unit in accordance with claim 3, wherein the folding of the first connecting element provides at least one folded section positioned adjacent to the first coupling element passage opening providing the coupling element clamping area, the at least one folded section comprising a folded end portion, wherein at least a portion of the second longitudinal area of the first coupling element passage opening is located beyond the folded end portion.

5. The support unit in accordance with claim 1, further comprising another first coupling element passage opening wherein a plurality of first coupling element passage openings are provided in the first connecting element.

6. The support unit in accordance with claim 5, wherein the first coupling element passage openings are arranged next to one another in relation to a coupling element direction of motion from the coupling element clamping area to the coupling element clamping release area.

7. The support unit in accordance with claim 4, wherein the at least one folded section is positioned between at least two first coupling element passage openings.

8. The support unit in accordance with claim 1, wherein at least the first connecting element is provided as a sheet metal part.

9. A drive system for a vehicle, the drive system comprising:
a drive unit with an internal combustion engine;
an exhaust system guiding combustion waste gases away from the internal combustion engine; and
at least one support unit comprising:
a first connecting element with a first coupling element passage opening, provided in association with the at least one coupling element, wherein a connecting element clamping area is provided in a first longitudinal area of the first connecting element passage opening and a connecting element clamping release area is provided in a second longitudinal area of the first connecting element passage opening, the connecting element clamping area having a greater thickness than a thickness of the connecting element clamping release area, the first connecting element passage opening being an elongated hole with an elongated hole longitudinal direction, wherein the first longitudinal area and the second longitudinal area follow one another in the elongated hole longitudinal direction;
a second connecting element with a second coupling element passage opening; and
at least one coupling element coupling the first connecting element with the second connecting element, the at least one coupling element passing through the first coupling element passage opening and passing through the second coupling element passage opening such that the at least one coupling element is movable along the first coupling element passage opening from the first longitudinal area into the second longitudinal area.

10. The drive system in accordance with claim 9, wherein the at least one support unit is arranged for supporting the exhaust system in relation to the internal combustion engine, or the drive unit comprises a transmission and the at least one support unit is arranged for supporting the exhaust system in relation to the transmission or the at least one support unit is arranged for supporting a first area of the exhaust system in relation to a second area of the exhaust system.

11. The drive system in accordance with claim 9, wherein the at least one support unit defines a coupling element direction of motion, from the coupling element clamping area to the coupling element clamping release area, that corresponds essentially to a longitudinal direction of a vehicle having the drive system.

12. The drive system in accordance with claim 9, wherein the first connecting element has a greater material thickness in the coupling element clamping area than in the coupling element clamping release area.

13. The drive system in accordance with claim 9, wherein the first connecting element is folded to form the coupling element clamping area, wherein at least a portion of the connecting element release area is located outside of the connecting element clamping area.

14. The drive system in accordance with claim 13, wherein the folding of the first connecting element provides at least one folded section positioned adjacent to the first coupling element passage opening providing the coupling element clamping area, the at least one folded section comprising a folded end portion, wherein at least a portion of the second longitudinal area of the first connecting element passage opening is located beyond the folded end portion.

15. The drive system in accordance with claim 9, further comprising another first coupling element passage opening wherein a plurality of first coupling element passage openings are provided in the first connecting element.

16. The drive system in accordance with claim 15, wherein the first coupling element passage openings are arranged next to one another in relation to a coupling element direction of motion from the coupling element clamping area to the coupling element clamping release area.

17. The drive system in accordance with claim 14, wherein the at least one folded section is positioned between at least two first coupling element passage openings.

18. The drive system in accordance with claim 9, wherein at least the first connecting element is provided as a sheet metal part.

19. A support unit for supporting an exhaust system of a vehicle, the support unit comprising:
a first connecting element comprising a first connecting element elongated opening, the first connecting element elongated opening comprising a first longitudinal elongated opening area and a second longitudinal elongated opening area, the first longitudinal elongated opening area being located adjacent to the second longitudinal elongated opening area, the first longitudinal elongated opening area defining at least a portion of a coupling element clamping area of the first connecting element, the coupling element clamping area comprising a first thickness, the second longitudinal elongated opening area defining at least a portion of a coupling element release area of the first connecting element, the coupling element release area having a second thickness, the first thickness being greater than the second thickness;

a second connecting element with a second coupling element passage opening; and at least one coupling element coupling the first connecting element with the second connecting element, the at least one coupling element passing through the first coupling element elongated opening and the second coupling element passage opening such that the at least one coupling element is movable along the first connecting element elongated opening from the first longitudinal area into the second longitudinal area.

20. The support unit in accordance with claim 19, wherein the first connecting element is folded to form the coupling element clamping area, wherein the folding of the first connecting element provides at least one folded section positioned adjacent to the first connecting element elongated opening providing the coupling element clamping area, the at least one folded section comprising a folded end portion, wherein at least a portion of the second longitudinal area of the first connecting element elongated opening is located beyond the folded end portion.

\* \* \* \* \*